May 5, 1942.　　　R. E. McDONALD　　　2,281,779
SUBSOIL STALK CUTTER
Filed Aug. 29, 1940

*Inventor:*
ROBERT E. McDONALD
By
G. J. Kramer
*Attorney*

Patented May 5, 1942

2,281,779

UNITED STATES PATENT OFFICE 2,281,779

SUBSOIL STALK CUTTER

Robert E. McDonald, San Antonio, Tex.; dedicated to the free use of the People in the territory of the United States Application August 29, 1940, Serial No. 354,705

1 Claim. (Cl. 55—60)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

In order to combat the pink bollworm of cotton it is necessary to destroy the cotton plants after harvesting of the crop. In localities where the fall and winter seasons are mild cotton becomes a perennial and it is extremely difficult to kill the plants on account of the tendency to sprout. If the plants are cut off at the surface of the ground, sprouts spring immediately from the roots and bear fruit within a few weeks and thus propagate the pink bollworm. If the plants are plowed up with conventional types of agricultural implements, lateral roots are left in contact with the soil which continue the life of large numbers of plants. In order to destroy the cotton plants and, at the same time, prevent sprouting it is necessary to cut the plants off from three to six inches below the surface of the ground and to sever all lateral roots.

The implement hereinafter described is a simple combination of elements that effectively accomplishes the work of cutting the cotton stalks at any desired depth underground and, at the same time, severs the lateral roots on both sides of the row. This implement consists of a special walking plow adapted to be drawn by two horses. The plow runs immediately on the left hand side of the row, permitting each horse to walk in the middle between two rows. The beam and the handles of this walking plow are essentially similar to the beam and handles of an ordinary two-horse walking turning plow. Furthermore, the clevis is the same and the depth to which the plow is to operate is regulated by putting the double-tree higher or lower on the clevis, and the regulation of the backbands and traces of the harness, as with the ordinary turning plow.

Figure 1:
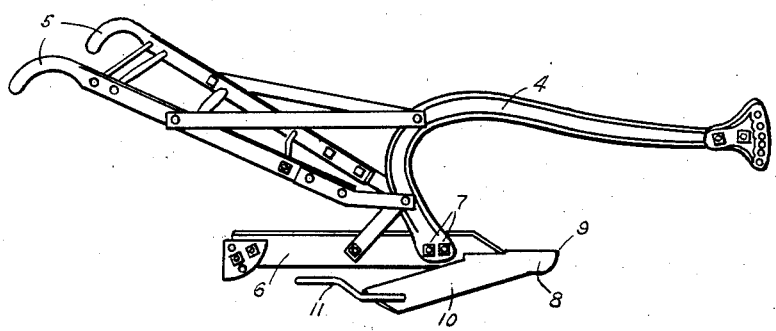
Figure 2:
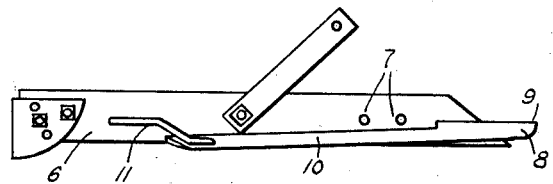
Figure 3:
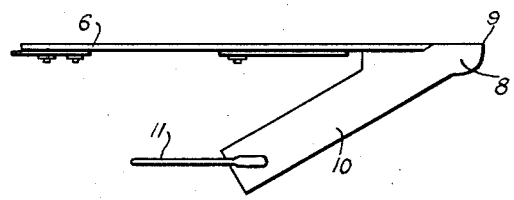

In the accompanying drawing, Figure 1 is the complete plow assembly; Figure 2 is a side view of that part of the implement which operates underground; and Figure 3 is a top plan view of the same part illustrated in Figure 2.

Referring with more particularity to the drawing, in which like numerals designate like parts, the numerals 4 and 5 designate the beam and handles, respectively, of the assembly. A long flat land-side bar 6 (preferably about 30 inches long) is secured to the beam 4 at 7. This landslide bar 6 operates beneath the surface of the ground to guide the implement in operation. A flat duck-bill point 8 is disposed on the front of the bar 6 to carry the implement into hard ground. The tip 9 of this duck-bill point is directed downward to offer resistance against a tendency to come out of the ground. A cutter bar 10 is secured laterally to the bar 6 adjacent the point 8, preferably at a horizontal angle of 30° with the bar 6 and a vertical angle of about 5°, substantially as shown, to give suction and to sever more satisfactorily the stalks. A rod 11 is secured to the outer end of the cutter-bar 10 and angles upward from the surface of said bar 10, approximately 30°, the function of which is to tear loose and destroy the lateral roots and plants on the side of the row opposite the beam 4 and the land-side bar 6.

The method of operating this implement is as follows: Horses, preferably two, are hitched to the implement in the same manner as horses are hitched to a turning plow. The plowman takes the handles 5, directing the horses each down the middle between two rows and guides the plow, with the duck-bill point 8, near the left-hand margin of the line of stalks in the row, after regulating the depth to which the plow is to operate by manipulation of the clevis, backbands, traces, etc., in the usual manner. As the plow moves forward, the roots of the line of stalks are severed by the cutter bar 10, at the depth the plow is adjusted to operate. The stalks are left standing, and the ground is not materially disturbed, but the stalks, being severed from the roots, immediately die, and if they are cut at a sufficiently low level they will not sprout again. Thus, this implement will effectively kill cotton stalks without disturbing the ground to any great extent. Many times cotton fields become very foul with grasses and it is desirable and profitable to utilize these grasses for pasturage. This implement will not destroy such grasses. It may sever the roots of said grasses, but in that event the grass will produce hay as forage. Also, this device will operate in a field regardless of how foul it may be with grasses or weeds.

Having thus described my invention, I claim:

An implement of the type mentioned comprising a long flat land-side bar to slide forward beneath the surface of soil, a flat duck-bill point on the front of said guide bar having its tip downwardly directed, a cutter bar having one end secured to one side of said guide bar near said duck-bill point and extending laterally and rearwardly therefrom, and a rod secured to the outer end of said cutter bar extending upward and rearward from said cutter bar to sever lateral roots beneath the surface of the ground.

ROBERT E. McDONALD.